INVENTORS
R. H. VARIAN
W. W. HANSON
BY
ATTORNEY

Patented Feb. 4, 1947

2,415,095

UNITED STATES PATENT OFFICE 2,415,095

RADIO MEASUREMENT OF DISTANCES AND VELOCITIES

Russell H. Varian, Wantagh, and William W. Hansen, Garden City, N. Y., assignors to The Board of Trustees of the Leland Stanford Junior University, Stanford University, Calif., a corporate body of California Original application January 17, 1938, Serial No. 185,382. Divided and this application September 19, 1942, Serial No. 459,039

16 Claims. (Cl. 250—1.66)

The present application is a division of application, Serial No. 185,382, for Radio measurement of distances and velocities, filed January 17, 1938.

Our present invention is concerned with the location of aircraft and other objects and the measurement of distances and velocities by radio means.

The principal object of the present invention is to provide a novel method and apparatus for locating aircraft or other craft from a remote point, such as from a point on the ground, regardless of visibility or atmospheric conditions.

Another object of the present invention lies in the provision of method and means employing high frequency radio waves for accurately and rapidly determining the distance of an object from a remote point and also, as in the case of an aircraft located from the ground, means is provided for quickly determining the azimuthal and elevational position of the craft as for purposes of anti-aircraft fire control.

Still another object of the present invention is to provide means for enabling the operator of an airplane to determine his position with respect to the ground.

A further object of the invention is to provide means for determining the presence of one craft from a remotely located craft and the measurement of the distance between the craft, as for preventing collision therebetween.

A further object of the invention is to provide means for determining the component of the remote object's velocity along the line extending from the present equipment to the object, or in the event the equipment is installed on a movable object, such as an aircraft, the relative velocity of the objects is determined along such line.

The present invention also provides means for effecting the transmission, modulation, and reception of alternating currents of frequencies of the order of $10^{10}$ cycles per second corresponding to wavelengths of from a fraction of a centimeter to a few centimeters.

Still another object of the present invention is the provision of apparatus that is suitable for locating and/or measuring the distance of objects on the ground or water from an aircraft, or the location of objects at sea from shore or from other fixed points.

The invention has for another object to provide novel apparatus for carrying out the method and measurements above mentioned.

This invention possesses numerous other objects and features of advantage, some of which, together with the foregoing, will be set forth in the following description of specific novel apparatus for carrying out and utilizing the novel method. It is therefore to be understood that the method is applicable to other apparatus, and that we do not limit ourselves to the apparatus of the present application, as we may adopt various other apparatus embodiments, utilizing the method, within the scope of the appended claims.

Part of the means used to accomplish the above objects mentioned are described in our Patents Nos. 2,190,712, issued in the name of W. W. Hansen, February 20, 1940, and 2,242,275, issued in the name of R. H. Varian, May 20, 1941.

In systems for location of aircraft heretofore employed there are generally three elements involved: first, a source of oscillating energy, second, means for causing that energy to be directed from or reflected from the aircraft (or if the observer is in an aircraft, possibly reflection from the ground) and third, a receiver for the energy. In clear daylight the sun furnishes light which is reflected from the aircraft and which is received by the observer's eye. At night a search light or a transmitter of other waves may direct a beam toward the aircraft and the reflected energy may be received by an observer. Under some conditions the sound of the airplane will disclose to an observer on the ground its location. Our invention is related to these other systems in a general way, i. e., to the extent that we employ radiated energy, but the means and method of accomplishment are novel. Prior methods and means, generally employing light or sound, have been unsatisfactory in use because of natural limitations involved. Thus, in the case of light, the operated devices are only operative under conditions of good visibility, and in the case of sound operated devices, the obtainable accuracy of location is very poor, so that these methods of locating objects are of limited utility, while our invention is fully operative regardless of weather conditions and has an accuracy comparable with optics. In our invention the use of very high radio frequencies together with novel methods of projection and reception permit accuracy in location of objects under all weather conditions. In addition, the methods and means for projecting and receiving accurately beams of radio radiation provided by the present invention have application to objects other than first mentioned, as, for example, confidential communication between ships at sea. What constitutes a preferred embodiment of the present invention is set forth in the specification following.

Figures 1, 2A, 2B:
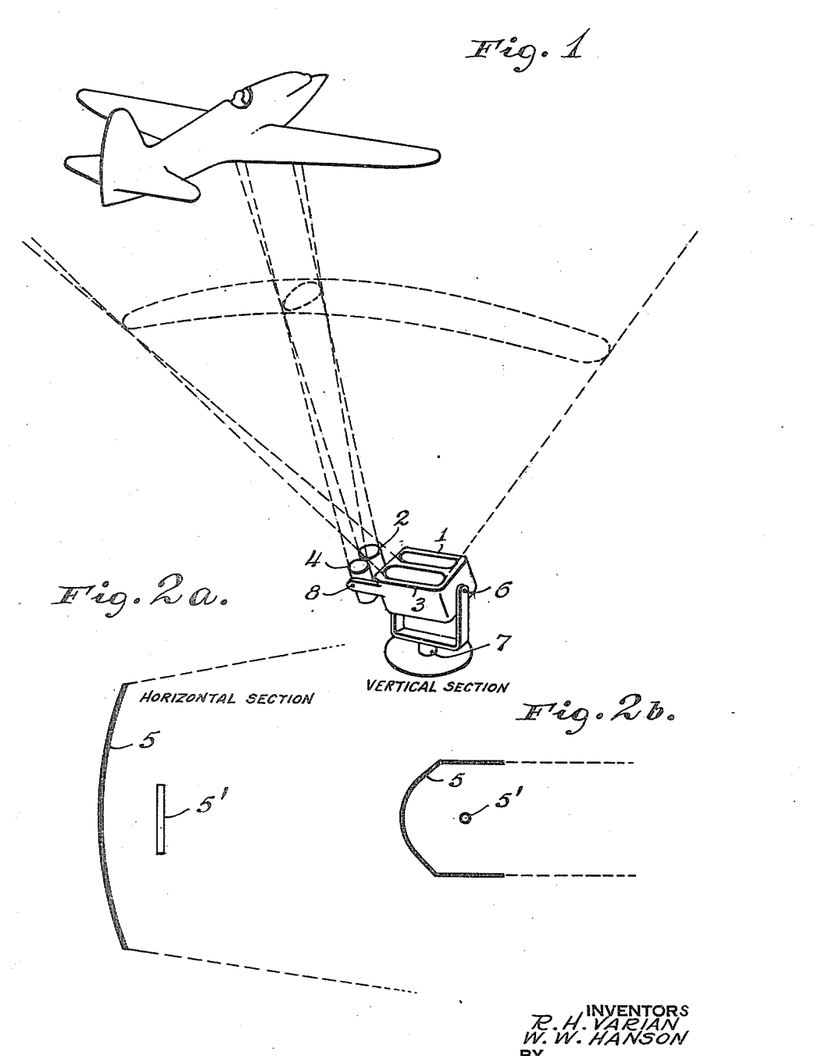
Fig. 1 is a schematic view of one form of the present invention and illustrates a general mode of operation.
Figs. 2A and 2B are schematic longitudinal and transverse sections of a radiator suitable for producing a fan-shaped beam.

The general mode of operation of our invention in an illustrative application is indicated in Fig. 1. In Fig. 1 a projector 1 directs a flat fan-like beam of radiation upward at a variable angle depending upon the angle of elevation of the projector. The beam is of small thickness and of relatively great extent or spread laterally. In thickness the beam is contained within an angle of a few degrees. Laterally its angular spread can be made any convenient angle up to 180°. The projector is trunnioned as at 6 so that the angular elevation of the beam is adjustable from 0° to 90° and pivoted on a vertical axis at 7 so that it can be rotated in azimuth through 360°. In this specification the beam of projector 1 wil lbe referred to as the "searching beam."

A second projector 2 producing a columnar beam is trunnioned and pivoted in connection with projector 1 so that its beam always has the same angular elevation about axis 6 as the beam of projector 1 and is rotatable in azimuth therewith, and so that its beam may be rotated laterally within the angular spread of the broad searching beam and in the plane thereof. The beam of projector 2 will be referred to as the columnar, pencil or "spotting beam." In the use of projectors 1 and 2 the assemblage is pointed in the general direction of the aircraft to be located. The projectors are then rotated in elevation so the searching beam intercepts an aircraft. Then projector 2 is rotated laterally until the spotting beam intercepts the aircraft already located in elevation by the searching beam. Once located, the beams can be moved angularly so as to continue to follow the aircraft as long as it is in range.

The radiation from projectors 1 and 2 is reflected by the aircraft and is received by receiver detectors that are similar to the projectors in their geometrical relationships. One receiver detector 3 having a fan-shaped zone of reception is arranged to receive radiation from any point of reflection in the fan searching beam and it is set to the same elevation and azimuth as projector 1. A second receiver detector 4 is illustrated in the drawings and is arranged to receive radiation within a small angle only, i. e., this receiver detector has a columnar zone of reception, and is set to the same angles as projector 2.

Projector 1 may be built conveniently using an elongated parabolic reflector 5 indicated in section in Figs. 2a and 2b. The section of 2b is that of a parabola for focusing radiation from a small source 5' into a parallel-sided beam as in ordinary searchlight practice. The section of Fig. 2a is that required for projecting a diverging beam of a desired angular spread.

Figure 3:
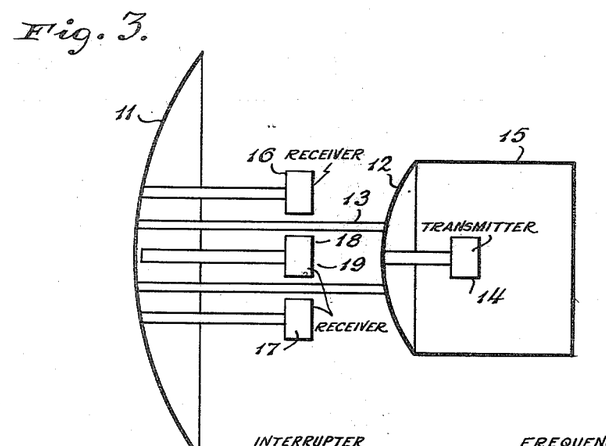
Fig. 3 is a sectional view of somewhat modified instrumentalities applicable to Fig. 1.

The arrangement of the spotting beam projector and receiver in which the projector and receiver elements are separate units, as shown in Fig. 1, can be conveniently replaced by a combination of the two elements in a single assemblage as shown in Fig. 3. In this arrangement the projector is made smaller than the receiver and is supported concentrically with it. The assemblage is pivoted and trunnioned as indicated in Fig. 1. In Fig. 3, 11 is the receiver reflector, 12 the projector reflector supported by strut members 13, while 14 is a transmitter at the focus of reflector 12, and 15 is an absorbing shield concentric with 12 for minimizing scattered radiation that might interfere with the receiver. Inside reflector 11 near the focus but above and below the same, as shown in the drawings, are placed two receivers 16 and 17 which are used to align the assemblage in elevation on the observed aircraft or object. Also, in reflector 11 on opposite sides of the focus and 90° displaced from 16 and 17 are shown two other similar receivers 18 and 19 for aligning the assemblage in azimuth on the observed object. In the event that spotting entirely with a columnar beam is desired, then both pairs of receivers 16—17 and 18—19 are used and but a single transmitter shown at 14 is employed, as shown in Fig. 3. However, in the event that a fan beam is employed for elevation scanning, as in Fig. 1, then the apparatus of Fig. 3 must be duplicated as in Fig. 1, but only two receivers are used with each receiver reflector, one transmitter reflector and receiver reflector in that case serving to provide a fan shaped beam of transmission and zone of reception, respectively. These pairs of receivers as well as the transmitters used in our invention are novel in principles of operation and construction. Also the circuits in which they operate are novel. The instrumentalities themselves and the connections between them are not excessively complicated considering the objects they accomplish, but they are of sufficient complexity to permit considerable variation in details of construction. Accordingly, the description to follow is restricted because of practical requirements of brevity to as simple a delineation as is consistent with clearness. The trunnioning and pivoting of the projectors and receivers, for example, follows conventional searchlight practice so will not be detailed here. The system of operation will be described first and after that the instrumentalities required for its accomplishment.

Figure 4:
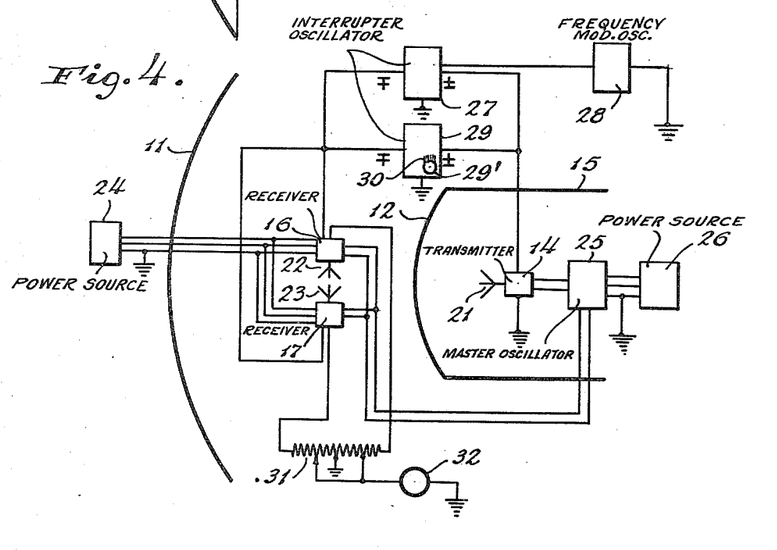
Fig. 4 is a schematic wiring diagram applicable to the system of Fig. 3.

Fig. 4 shows in schematic form a wiring diagram of the form of our invention shown in Fig. 3, and in which parts corresponding to those in Fig. 3 are similarly numbered. In Fig. 4, 11 is a receiving reflector, 12 is a projecting reflector, 14 is a transmitter radiating by means of an antenna 21 at the focus of reflector 12, 16 and 17 are receivers with antennas 22 and 23 near the focus of reflector 11 and above and below it. Since receivers 18 and 19 operate similarly to receivers 16 and 17, the former are not shown in the figure in order to simplify the same and the description. Further, the receivers 18 and 19 would not be used in the event the fan shaped scanning beam of Fig. 1 is employed. 24 is a power source for receivers 16 and 17; 25 is a master oscillator shown as receiving energy from a source 26 and which delivers high frequency currents to the transmitter 14 and receivers 16 and 17 and to receivers 18 and 19 in the event that these receivers are used, as when searching with a columnar beam only; 27 is a high frequency interrupter oscillator subject to frequency modulation by another oscillator 28; 29 is an adjustable frequency interrupter oscillator; 31 is a potentiometer and 32 designates indicating apparatus.

In the ordinary mode of operation of our invention the master oscillator 25 oscillates steadily at a high frequency. For convenience this will be assumed to be $3 \times 10^{10}$ cycles per second corresponding to a wave length of one centimeter. Oscillator 25 delivers to transmitter 14 and to receivers 16 and 17 energy of the high frequency. In transmitter 14, the high frequency energy received is amplified and energy at the high frequency is radiated by the antenna 21. The transmitter 14 is controlled by two interrupter frequency oscillators 27 and 29. One of these, 27, delivers to transmitter 14 a frequency whose half period is of the order of a thousand times the period of the transmitter's freuency. This interrupter frequency operating through suitable means at the transmitter causes the latter to radiate in alternate periods corresponding to alternate half cycles of the interrupting frequency, but for a little less than the duration of the half period. Preferably, the interrupter frequency half period should not be much less than a thousand periods of the radiated frequency so as to enable the transmitter to build up its oscillations to a steady value within the periods of operation between interruptions. If the radiated frequency is $3 \times 10^{10}$ cycles per second, the interrupter frequency can be of the order of $10^7$ cycles per second. The purpose of interrupting the radiated wave is to prevent the transmitter from interfering with the receiver. When the transmitter is off, the receiver is on and vice versa. The interruption of reception is accomplished by means similar to that controlling transmission, using the interrupter frequency of oscillator 27.

Oscillator 27 is illustrated as controlled by a frequency modulation oscillator 28 which changes the frequency of oscillator 27 about 1% at a frequency of the order of 100 cycles per second, i. e., a range of from about forty to several hundred cycles. The purpose of this is to shift the frequency and wavelength of the interrupter frequency periodically so there will be no distances or zones along the radiation beam for which the returned signal is zero long enough for an object at that distance in it to go undetected. The transmitter when operating will send out trains of waves of say 1000 cycles. Then there will be an interval of the same or slightly greater length with no radiation unless the length of the intervals is changed. The distance corresponding to 1000 cycles of a 1 centimeter wave is 10 meters. If the distance between the observer and the observed object is 1000 meters, or 100 intervals, a change of 1% in the length of the interval will shift the 100th interval a distance equal to its own length. Inasmuch as the minimum range at which detection of aircraft in military operations would be important is usually more than 1000 meters, a periodic change of 1% in the interrupting frequency is sufficient. There are several known methods of changing the frequency of an oscillator so it is not deemed necessary to show how this is accomplished. Typical apparatus for accomplishing this is disclosed in Proceedings of the Institute of Radio Engineers, vol. 22, No. 7, July, 1934, Transmission Lines as Frequency Modulators, and Bulletin of University of Washington Engineering Experiment Station, Bulletin No. 68, January 2, 1933, Side Bands in Frequency Modulation, by E. D. Scott and J. R. Woodyard. The frequency at which the change in interrupter frequency is made through use of frequency modulator 28 is limited by the provision that a train of waves must be able to go to the observed point and back to the receiver in a time short in comparison with the period in which the frequency of 27 is changed by frequency modulator 28. This is determined by the maximum range which may be assumed to be of the order of 30,000 meters. The time required for a wave to travel 60,000 meters is $2 \times 10^{-4}$ seconds. This must be small in comparison with the period of the frequency modulation of the interrupting frequency. If a factor of 100 is assumed, the period will be $2 \times 10^{-2}$ seconds or the frequency will be about 200 cycles per second, or less. To summarize up to this point, oscillator 25 will deliver a steady frequency of $3 \times 10^{10}$, oscillator 27 will deliver a frequency of about $10^7$ cycles per second, frequency-modulated about 1% at about 200 cycles per second by oscillator 28. Transmitter 14 will thus radiate a frequency of $3 \times 10^{10}$ cycles per second at slowly varying intervals corresponding to a frequency of about $10^7$ cycles per second. The receivers 16 and 17 will be operative in the intervals between the sending intervals. If the frequency of oscillator 27 is made sufficiently high or the objects searched for are sufficiently large, the frequency modulation oscillator 28 may be omitted.

A second interrupter frequency oscillator 29 interrupts the sending and receiving at a frequency lower than that of oscillator 27. This oscillator is used for determining the distance between the observer and an observed object. Its frequency is variable between limits dependent upon the maximum and minimum ranges in which observations are possible. In the above example, oscillator 27 interrupts the transmitter 14 at intervals corresponding to a frequency of $10^7$. Oscillator 29 interrupts the transmitter for a longer period, i. e., after it has transmitted a hundred or a thousand or more of the short intervals. The long intervals of interruption controlled by oscillator 29 are used in determining distance while the short ones controlled by oscillator 27 serve to eliminate interference by the transmitter with the reception of the reflected transmitted waves. In measuring distance from the observer to an observed point, the frequency of oscillator 29 is first adjusted to a higher value than is needed for the actual measurement. It is then gradually decreased by turning knob 29'. At certain frequencies the distance traversed by the radiation is an odd number of half wavelengths of oscillator 29. At these frequencies a pulse radiation will leave the projector, travel to the observed point and return to the receiver, arriving when the transmitter is off. As the frequency is changed the received signal will vary between zero and a definite maximum. The frequency whose wave length is 4 times the distance to the observed point is the lowest frequency that will give an observed maximum in the received signal. Reducing the frequency still further will cause a gradual decrease in the received signal without producing additional maxima or minima. Accordingly the distance can be determined by reducing the frequency of oscillator 29 until the last maximum is observed and then, for sharpness of response, setting the frequency on that giving the zero signal just above the last maximum. Calibration of the frequency adjuster to read in meters or other scale of distance corresponding to the frequency at which the zero reading preceding the last maximum occurs enables us to read distance directly, i. e., the indication of the pointer of knob 29' on scale 30. For a distance of 1000 meters it is 75,000 cycles.

In measuring distance by the method just described, oscillator 29 has been referred to as an "interrupting oscillator." Actually it is not necessary or even always desirable for oscillator 29 to interrupt the transmission of waves. Instead, under some circumstances, it is more desirable for oscillator 29 to merely amplitude modulate the transmitted waves sinusoidally.

It will be apparent that the plurality of interrupting frequencies described with reference to Fig. 4 need not all be used in all circumstances. For example, when the system is used in aircraft for altimeter purposes wherein a simple measurement to the ground is desired, the interrupter frequency oscillator 27 and its accompanying frequency modulator 28 can be dispensed with. Under these conditions entire control of the transmitter 14 is accomplished by the distance measuring interrupting frequency oscillator 29.

In Fig. 3 a cylindrical absorbing shield 15 as of slightly conducting material is shown concentric with reflector 12. This shield is advantageous if the interrupter 27 is not used, and the oscillator and amplifier are in continuous operation while the searching process is in progress. It will be easily seen in Fig. 3 that if shield 15 absorbs most of the radiation except that collimated by the reflector, there will be little radiation diffracted back to the receivers, and that which is so diffracted will be very nearly cancelled because it enters two opposing members of a receiving pair in substantially equal amounts.

In the receiving arrangements, it has been indicated in Fig. 3 that there is a receiver 16 above and a similar device 17 below the focus of the reflector for determining the angular elevation of the beam and receivers 18 and 19 on opposite sides of the focus for lateral setting. The vertical and lateral circuits are identical electrically although only one member of a pair need be used for distance determinations. In each pair of receivers the output connections are opposed, and the points of reception are located slightly off the reflector axis and on opposite sides of it so that the receivers look at overlapping but slightly offset bits of sky centered slightly on opposite sides of the reflector axis. With such an arrangement, an object on the reflector axis will excite equal signals in each receiver which will exactly cancel each other, giving zero resultant signal, but if the object is slightly off the axis it will excite one receiver more than the other, giving a resultant signal the sign of which indicates on which side of the reflector axis the object lies.

Under some circumstances, the receiver 4 of Fig. 1 may be dispensed with, and all reception performed in receiver 3, in which case the transmitter 2 is swept along the fan beam until a maximum response is obtained from receiver 3. Also, projector 2 and receiver 4 may be made similar to 1 and 3 for broad or fan-shaped beams, but oriented at right angles to 1 and 3 so the two broad beams intersect to provide sharply defined location of objects at that point and location in zones by either of the broad beams alone.

The instrumentalities used in the several parts of the system shown in Figs. 1 to 4 will now be described. It is principally in the frequencies higher than $10^8$ cycles per second and particularly higher than $10^9$ that our novel means are most valuable. For these frequencies our transmitters and receivers can be adapted conveniently to parabolic reflectors, and in addition they are adaptable to a new type of projector that can be used instead of parabolic reflectors. They can also of course be used for reception.

These novel projectors, in transmission more properly termed radiators, are modifications of the resonant chambers described by W. W. Hansen in his Patent No. 2,190,712. This radiator is essentially a hollow conducting body in which electromagnetic oscillations of definite mode can be established, and from which they can be radiated through suitably placed openings. These resonant chambers or internally resonant hollow conductors are used in several ways in our present invention, and for convenience will be referred to in this specification hereafter as hollow resonators.

Figure 5:
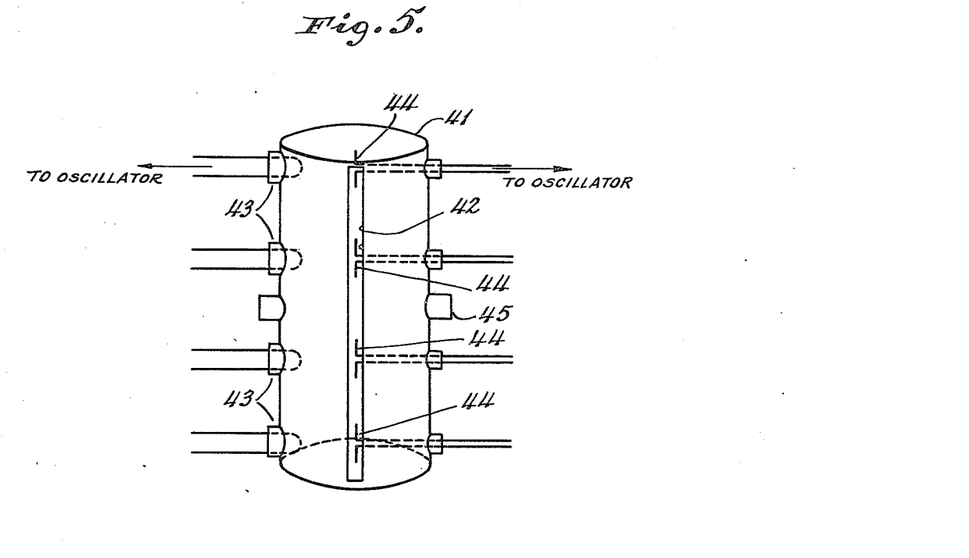
Fig. 5 is a representation of a novel type of electromagnetic radiator for broad or fan beam radiation.

Fig. 5 shows one illustrative form of hollow resonator suitable for radiating a beam of the form that would be projected by the arrangement shown in Figs. 2a and 2b and indicated at 1 in Fig. 1. In Fig. 5 the radiator is illustrated as a hollow resonator 41 of cylindrical form with a slot 42 out in the side parallel to the axis of the cylinder. The hollow resonator is either excited by one or more inductive loops 43 connected to oscillators, or by one or more small di-pole antennae 44, or by any other convenient means. The essential feature of this type of radiator is a hollow resonator with a major axis long compared to the wavelength of the standing waves inside, and a slot or aperture extending over a distance along the major axis which is long compared with a wavelength. The electric vector of the contained electromagnetic field is parallel to the major axis and is directed all along its length in the same direction at any instant. The slot does not need to be parallel to the major axis. If these conditions are fulfilled, radiation will emerge from all the apertures or from the whole slot in phase. The well known laws of diffraction then limit the radiation to a beam collimated in the plane of the major axis. The radiation from the slot is collimated in the axial direction and is diffracted radially as light is diffracted in leaving an optical slit. The behavior analogy to the optical case of the electromagnetic waves in free space after they leave the slit is determinable by use of the diffraction theory of light. The cylinder 41 is mounted on trunnions 45 in the way corresponding to the way the projector 1 in Fig. 1 is mounted. The searching beam is elevated to the desired angle by inclining the axis of the cylinder 41 from the vertical. The lateral spread of the beam is centered about the radius drawn from the center of the cylinder 41 through the center of the slot 42. The wavelengths found most useful for the objects mentioned are those of the order of one to ten centimeters. For these wavelengths the radius of the cylinder 41 is from about one third of a centimeter to about five centimeters, or may be much more if the resonator is operated on a harmonic of its fundamental frequency.

Figure 6:
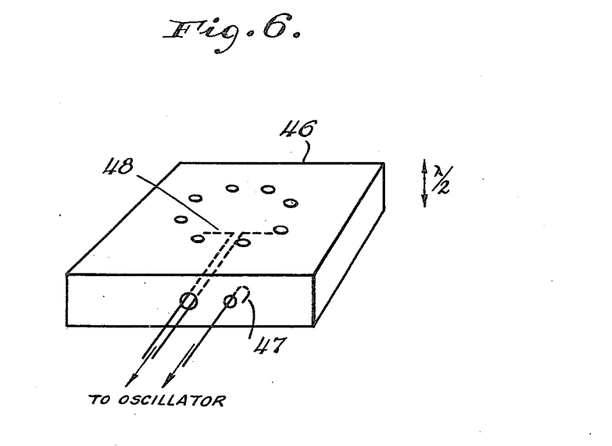
Fig. 6 is a representation of a novel type of electromagnetic radiator for narrower or columnar beam radiation.

Fig. 6 shows one illustrative form of narrow beam radiator. It comprises a hollow resonator 46 shown as of generally rectangular or approximately square form having a side of dimensions large in comparison with wavelength, and a depth dimension approximately lambda/2 ($\lambda/2$) or in the event that the resonator operates on a harmonic, the depth will be approximately a multiple of lambda divided by 2 ($\lambda/2$) where lambda ($\lambda$) is wavelength. The resonator is either excited by one or more loops 47 or by one or more small di-pole antennae 48 inside driven by oscillators of proper frequency. In one face of the resonator there are holes having diameters which are a fraction of the wavelength and conveniently although not necessarily spaced in a circle. The electromagnetic field inside the resonator radiates from each of the holes in phase, the electric vector of the contained field being parallel to the face having the holes therein and being of the same phase throughout the immediate region adjoining the face of the resonator. The mutual interference of the radiation from the holes restricts the resultant total radiation to a beam whose axis is perpendicular to the radiating face of the resonator and contained in a cone having an angular spread which is a function of the ratio of the wavelength to the dimensions of the pattern of the radiating holes.

Figure 7:
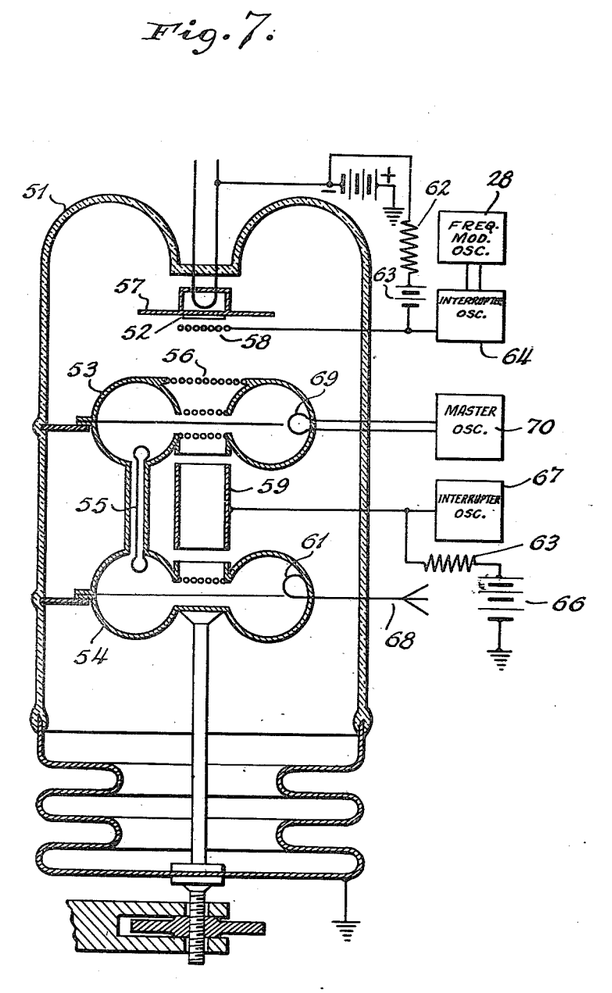
Fig. 7 is a sectional diagrammatic representation of a novel form of modulated radio frequency oscillator-amplifier.

With reference to the transmitters for activating antennae such as indicated at 5' in Figs. 2a and 2b and 21 in Fig. 4, Fig. 7 shows an illustrative form suitable for use inside reflectors or with hollow resonator radiators. The assemblage shown uses an oscillator of the kind disclosed in Patent No. 2,242,275, with novel additions necessary in our present invention. In Fig. 7, 51 is an evacuated container, 52 is a heated electron emitter, 53 is a hollow resonator with two grids confining a field, 54 is a hollow resonator with one grid and a plate, 55 an electrical coupling between the two resonators, and 56 a collimating grid for maintaining an electric field of the desired form, all of which are shown in the patent referred to. A plate 57 coacts with grid 56 for the delineation of the field used to accelerate the electrons from the emitter 52; a grid 58 is used for controlling the electrons leaving the emitter 52, a tube 59 is used for controlling the electrons in their travel between resonators 53 and 54 and a radiating coupling loop 61 is shown in the resonator 54. The grid 58 is connected to a resistor 62, a battery 63 and an oscillator 64. The tube 59 is similarly connected to a resistor 65, a battery 66, and an oscillator 67. The loop 61 is connected to a radiating antenna 68. Another loop 69 connected to an oscillator 70 provides excitation when the assemblage is used as a power amplifier.

In the operation of this combination, oscillations of a wavelength in the region of 1 centimeter to 20 centimeters are produced in the way explained in the above-mentioned Varian patent No. 2,242,275. These oscillations are modulated or periodically interrupted by applying to grid 58 a negative potential with respect to the cathode 52 and impressing thereon an alternating or undulating voltage generated by the oscillator 64, which oscillator corresponds to either or both oscillators 27 and 29 of Fig. 4. The modulation can be accomplished also by applying an undulating voltage to the electrode 59 with respect to the potential of the resonators by use of oscillator 67, which also corresponds to oscillators 27 and 29 of Fig. 4. These methods of modulation can be used either together or singly. The frequency of the interrupting potential is subject to the restriction that it should be low enough to permit the oscillation of the resonators to follow the interrupting frequency. We have found that if the interrupting frequency is about one thousandth that of the resonator frequency, as explained in connection with Fig. 4, the system will operate. The arrangement shown in Fig. 7 can be used in several ways. It will act as a self-oscillator by having the two hollow resonators 53 and 54 tuned to the same frequency and exchanging energy between them through the coupling loop 55. It will act as a power amplifier by exciting it at the frequency of the resonators by use of the loop 69 which receives energy from the oscillator 70 corresponding to oscillator 25 of Fig. 4. In such case feed back 55 is adjusted so as to prevent self oscillation. It will act as a frequency multiplier by using the upper resonator 53 as a buncher at one frequency and tuning the lower resonator to a harmonic of the buncher frequency. As explained in Patent No. 2,242,275, the electrons leaving resonator 53 will have variable velocities, depending upon the phase of the oscillating circuit while the electrons are passing through, so that accelerated electrons will catch up with retarded electrons, thereby changing the stream of electrons from a uniform beam to one consisting of a series of concentrations or groups or bunches of electrons which pass a given point with the same frequency as the exciting frequency of member 53, so that this member serves as a buncher of the electron stream. In any of its modes of oscillation or amplification, modulation can be accomplished by the introduction of suitable modulation potentials to the grid 58 or the tube 59, or both.

Figure 8:
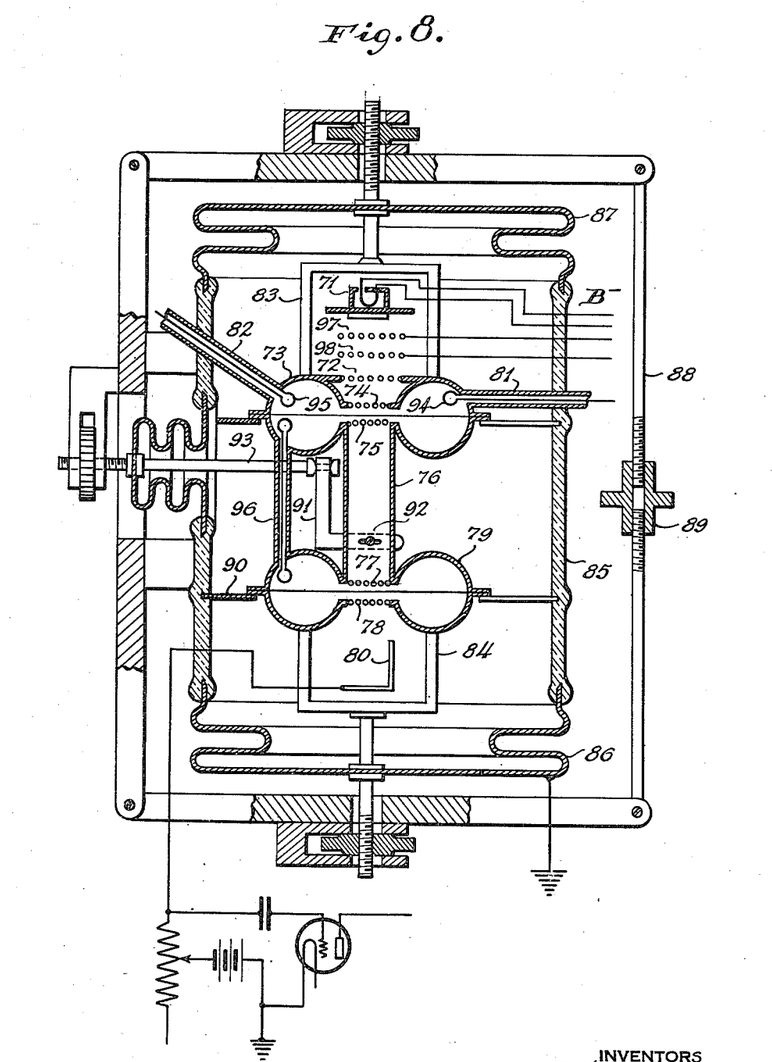
Fig. 8 is a sectional representation of a novel radio receiver.

The receivers used in our invention and indicated in Figs. 1, 3, 4 and 10 by the numbers 16 to 19 inclusive are made in the novel form shown in Fig. 8, in which 71 is an electron emitter, 72 is a collimating grid, 73 is an electron grouping resonator having grids 74 and 75, 76 is a tube fastened between resonator 73 and an energy absorbing resonator 79, 77 and 78 are grids of resonator 79, 80 is a detector electrode, 81 is a concentric line for the incoming signal which is delivered to a coupling loop 94, 82 is a concentric line for an incoming heterodyne frequency which is delivered to a coupling loop 95, 83 is a mechanical connection for tuning adjustment of the resonator 73 as to resonant frequency, 85 is an evacuated container with flexible couplings 86 and 87 at the ends, 89 is a mechanical arrangement for adjusting parts 73 and 79 simultaneously as to frequency through links 83 and 84 by relative displacement, i. e., by bodily compressing or expanding the members 73 and 79 as explained in Patent No. 2,242,275, 76 is a tube giving mechanical support between the two resonators 73 and 79 to which is attached a lever 91 slotted and pinned with a pin 92 to tube 76 and adjusted by a mechanical member 93, 96 is an adjustable coupling arrangement between resonators 73 and 79 of the type disclosed in Patent No. 2,242,249, issued in the names of W. W. Hansen and R. H. Varian, May 20, 1941, and 97 is a grid for controlling the electron stream, this grid being connected to oscillators 27 and 29. If desired, these oscillators may be connected to separate grids 97 and 98.

The operation of the receiver shown in Fig. 8 is somewhat similar to that of a vacuum tube circuit with two tuned circuits. The two resonators are turned to about the same frequency. An input signal to which resonator 73 is tuned is introduced through the line 81 to the coupling loop 94. This causes the resonators 73 to contain a weak electromagnetic field which acts upon a stream of electrons from the emitter 71 as they proceed through the resonator from grid 74 to 75 after being accelerated by a field between the emitter 71 and collimating grid 72. In addition to the incoming signal at 94, the resonator 73 receives a signal through loop 95 of nearly the same frequency for heterodyning with the input signal. This heterodyning signal combines with the input signal to establish the oscillating electromagnetic field in member 73 that acts on the electron stream to cause the same to become bunched, as described in Patent No. 2,242,275, as it travels toward the grids 77 and 78 of the oscillating resonator 79. The resonator 79 oscillates with varying intensity analogously to the plate circuit of an ordinary heterodyne detector as the phase between the signals of loop 94 and loop 95 shifts, and accordingly it causes the velocity of the electrons emerging from the field between grids 77 and 78 to vary recurrently at the beat frequency. The electrode 80 is adjusted to a negative potential so that some of the electrons in the stream are deflected away from it while others hit it depending upon their velocities. Two adjustments are possible, one so that almost none of the electrons of normal velocity, i. e., those passing through where neither the input nor heterodyne signals are supplied, strike the electrode and the other so that nearly all the electrons of normal velocity strike it. In either adjustment, when a signal is added there will be electrons approaching the electrode with velocities both greater and less than the velocities without the signal. In the first adjustment those electrons of velocities greater than before will hit the electrode so that the current from electrode 80 will increase. In the second adjustment all the electrons of lowered velocity will miss the electrode while those of increased velocity will continue to hit; so the current from electrode 80 will decrease. In either case, the average current from electrode 80 will be a function of the strength of oscillation in 79, as is required for signal detection. The coupling loop 96 between resonators 73 and 79 can be adjusted for such amounts of regeneration between the two circuits as may be desired. The output from electrode 80 being of frequencies in the ordinary ranges, can be amplified in ordinary vacuum tube circuits. The two grids 97 and 98 are used for modulating or interrupting the output of the detector.

Figure 9:
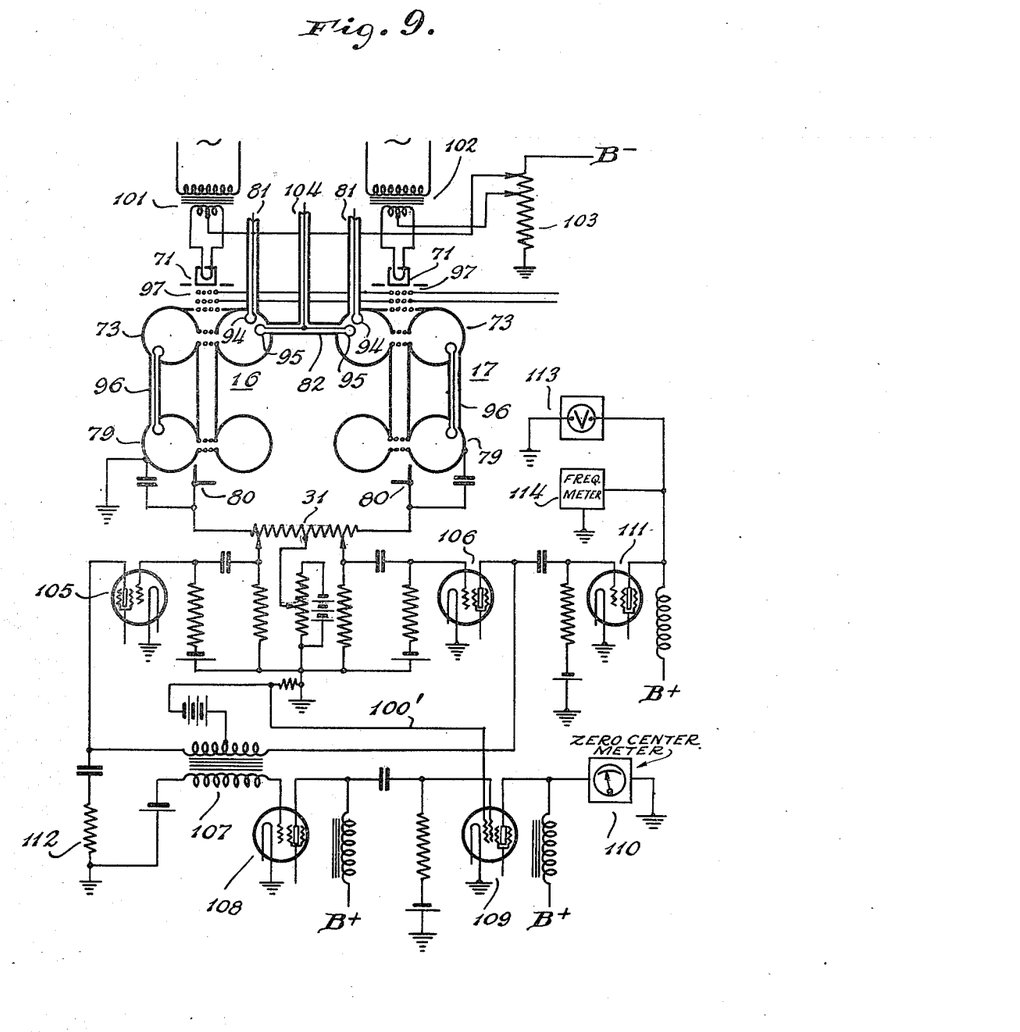
Fig. 9 is a receiver circuit diagram applicable to our invention.

The way in which the detector in Fig. 8 is used in the system shown schematically in Fig. 4 is indicated by the diagram Fig. 9. In Fig. 9 the pair of receiver elements for use in either azimuthal or elevational indications, as the case may be, are indicated by the same numbers as in Fig. 8. The other parts of the circuit are emitter heating transformers 101 and 102 each connected to one of duplicate detectors. These transformers have a secondary winding midtap connected adjustably to the negative side of a source 103 of direct current whose positive side is connected through the grounded frame of the apparatus to the resonators 73 and 79. The individual adjustment of voltage for the two receivers where connected to the current source 103 is for correcting any unbalance between the two detectors caused by mechanical or electrical dissymmetries. The incoming signal to the receivers is brought by concentric lines 81 from the receiving antennas indicated by 22 and 23 in Fig. 4 to the coupling loops 94 in the resonators 73. The heterodyning frequency is brought by a concentric line 104 from the master oscillator shown at 25 in Fig. 4. This frequency differs by a small percentage from the received signal reflected from the observed object depending upon the relative velocities of the observer and the observed object. The difference between these two frequencies determines the frequency of the detected output frequency of the unit. The grids 97 of the two detectors are connected as indicated in Fig. 4 to the two oscillators 27 and 29. These oscillators operate at ordinary radio frequencies and can be of conventional vacuum tube design. They impress on grids 97 undulating voltages that are capable of interrupting the electron streams in the detectors causing them to be on and off during the alternate half cycles of the controlling currents.

The two electrodes 80 deliver detected currents having frequencies that are the difference between the signal and heterodyning frequencies in resonators 73. The two output currents of the two detectors are brought together at ground through the potentiometer 31. Connected to the potentiometer there are a number of circuit elements shown in Fig. 9 which are indicated by element 32 in Fig. 4. Two amplifying tubes 105 and 106 with input and bias connection of conventional type deliver their plate oupus to a center-tapped transformer 107, the secondary of which drives an amplifier 108. The amplifier 108 acting through a mixer amplifier 109 provides an indication in a zero center meter 110. Transformer 107 supplies the difference of the voltage outputs of tubes 105 and 106 to the control grid of tube 109, whereas the sum of the voltage outputs of tubes 105 and 106 is supplied by lead 109' to the auxiliary grid of tube 109 so that the product output of this tube will be the difference of the squares of the voltage outputs of tubes 105 and 106 suitable for operating the zero center meter 110. When the two output currents from the electrodes 80 are equal the indication in 110 is zero. This provides means for aligning the assemblage shown in Fig. 4 on a target.

Connected to the one side of the primary of transformer 107 there is an amplifier 111 and on the other side a load 112 equivalent to that of amplifier 111. Amplifier 111 delivers to indicator 113 of the voltmeter type signals proportional to the output of an individual detector. It also delivers signals to a frequency meter 114. The indicator 113 is used in determining the distance from the observer to the observed object, and the frequency meter 114 the velocity of the target toward or away from the observer. The operation of the distance meter is as explained in connection with Fig. 4 with reference to variation of the frequency of oscillator 29. The measurement of velocity with the frequency meter 114 depends upon the change in frequency of a wave received from a moving source. If a beam from the projector 12 in Figs. 3 and 4 is reflected from a target back to a point near the projector, such as receiver 11, the frequency, because of the Doppler effect, will be increased when the distance is decreasing and will be decreased when the distance is increasing. The difference between the frequency of the transmitted and received signals will be proportional to the velocity toward or away from the observer. This difference of frequencies, as mentioned in connection with Fig. 8, will appear in the detected current output of the detectors. Measurement of the frequency by ways already known will indicate the velocity.

The general scheme of operation of the preferred form of our invention as illustrated can now be summarized. High frequency radio signals are transmitted in pulses by a transmitter 14 in connection with a reflector 12 or by an oscillator with a radiator of the type shown in Fig. 6. The transmitted signals are reflected by an observed object which may be an airplane or, if the observer is in an airplane, the ground or another airplane. The received signal is received by any suitable receiver controlled by an oscillator 27 so that the receiver is off when the transmitter is sending and vice versa. The intervals of transmission are caused to vary periodically in length by a low frequency oscillator 28 so that no part of the space near the observed object is unexplored by the signal. The intervals of transmission are sent in groups interrupted in comparatively longer periods by an oscillator 29 which is variable so that the lengths of the transmitted groups, i. e., the period permitted to transmit each group, can be varied. The way the signals are transmitted may be thought of as follows with reference to Fig. 4. The oscillator is controlled so that it sends a carrier wave of about $10^{10}$ cycles per second cut up in dots by 27 and sent at the rate of about $10^7$ per second. The strings of dots are cut up by 29 so that they are sent in variable strings of from about 100 to a few thousand. The observer first locates a target using the arrangement shown in Fig. 1. Then with the spotting beam on the target he keeps the spotting beam in alignment on the target by the use of an indicator 110 which indicates zero when alignment is correct. The observer adjusts the frequency of the oscillator 29 until the last periodic reading as the frequency is decreased indicates range to the target. He determines its velocity by use of the frequency meter 114. In reference to Figs. 3 and 9, it will be understood that a pair of receivers connected as shown in Fig. 9 would be used, one for lateral finding and one for vertical finding in the system. Only one member of a set however need be used for the determination of distance and velocity.

Figure 10:
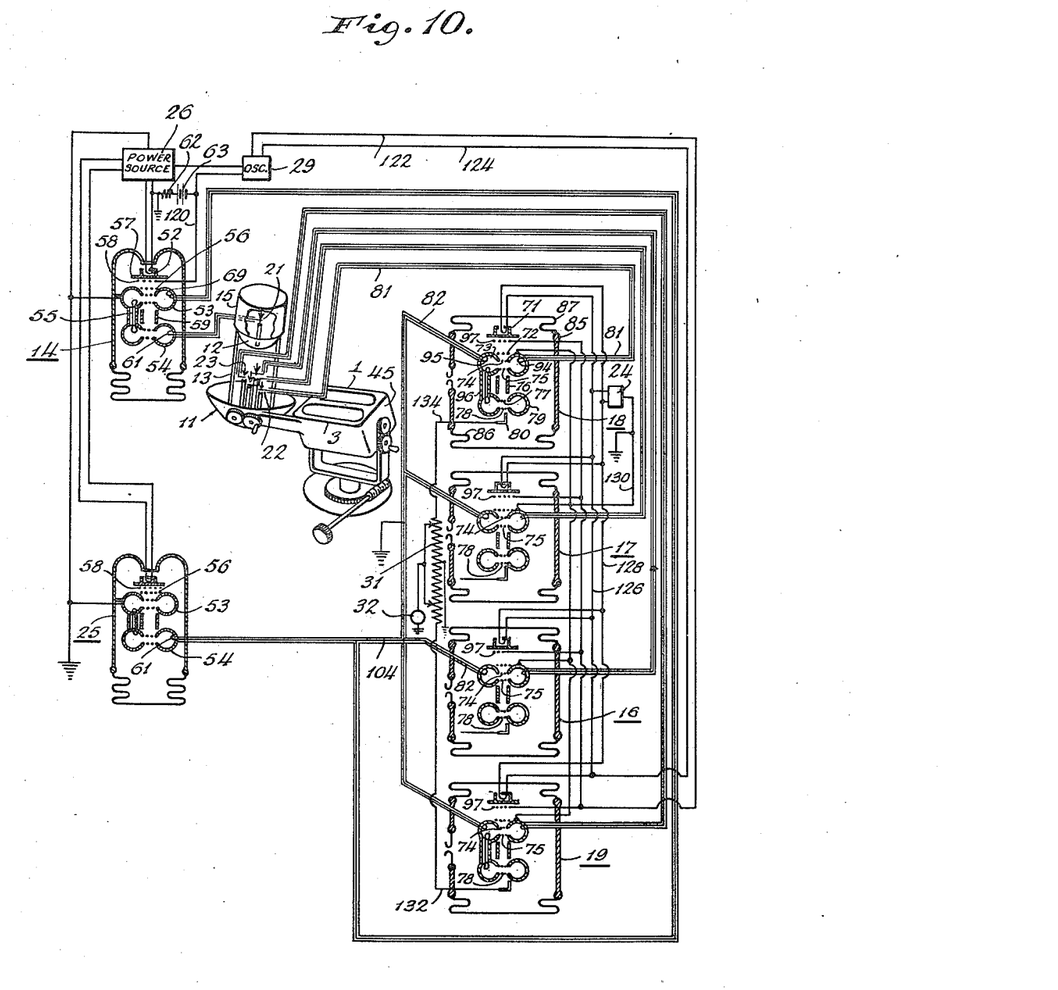
Fig. 10 is a schematic assembly view of the apparatus of this invention.

In Fig. 10, the present system is illustrated as a whole with the exception of the interrupter oscillator 27 and the frequency modulator 28, which are omitted for the purpose of simplifying the drawings. In this figure, the spotting beam transmitter and receiver, shown as of the concentric type illustrated in Figs. 3 and 4, are shown connected to their respective circuits, whereas the circuits of the fan or searching beam are omitted for purposes of simplicity. However, the fan beam transmitter and receiver circuits are identical with those of the concentric type.

Master oscillator 25 of the type shown in Fig. 7 supplies its generated frequency from the output resonator 54 over concentric lines 104 to the input resonator 53 of transmitter 14 of a design similar to oscillator 25 and also supplies this ultra high frequency to the input resonators 73 of receivers 16, 17, 18 and 19 of the type illustrated in Fig. 8. The radiator 11 previously shown in Fig. 3 concentrates the received reflected energy and provides the same over coaxial lines 81 to the respective input resonators of receivers 16 to 19. The cathodes 71 of these receiving devices are heated by the power supply 24 shown in Fig. 4 through leads 126 and 128, while the constant potential of the various hollow resonators is maintained at ground by a lead 130. The interruption oscillator 29 provides control pulses over a lead 120 to the control grid 58 of the transmitter 14, and pulses of effectively opposite polarity over leads 122 and 124 to control grids 97 interposed in the electron beams of the receivers 16 to 19. A lead 132 from detector electrode 80 in receiver 19 and a lead 134 from the similar electrode in receiver 18 connect to the indicating circuit symbolized by the meter 32.

In some possible applications of our invention it will be desired to use only a portion of the type of measurement it provides. For example, in spotting air targets in antiaircraft firing it will usually be sufficient to locate the target in azimuth and elevation and to measure the range. In its use as an altimeter for aircraft the distance measuring feature is all that is required. If velocity of climb is desired, the velocity can be measured by adding the frequency meter. For collision prevention a broad detecting beam and a distance indicator might be sufficient. Other arrangements will occur to those skilled in the art and will be deemed to be included in the scope of the appended claims.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A system for measuring distance comprising a high frequency radio transmitter for transmitting energy towards an object, a radio receiver, for receiving energy as reflected from said object, means for alternately and periodically interrupting the operation of the transmitter and receiver at a predetermined frequency, means for periodically changing the frequency of interruption of the transmitter and receiver for rendering said receiver responsive to objects at any distance within range of said system, and amplitude modulating the transmitted and received energies substantially in phase opposition, said last named means being adjustably settable as to frequency for causing the received modulated energy to be a maximum, the setting of said modulating means providing an indication of the distance from the transmitter and receiver to the object reflecting the transmitted energy.

2. In a system for determining unknown parameters of a remote object, a transmitter of high frequency radio waves, a high frequency receiver for receiving said waves after reflection from the remote object, oscillator means connected to said transmitter and receiver for alternately and periodically interrupting the operation of said transmitter and receiver at selected frequencies for measuring the distance to the remote object, and additional oscillator means also connected to said transmitter and receiver for alternately and periodically interrupting the operation thereof at a frequency higher than that of said first oscillator means to eliminate interference between said transmitter and receiver.

3. A system for determining unknown parameters as defined in claim 2, wherein said receiver has means for beating the received signal against the transmitter frequency to determine the velocity of the object along the line extending therefrom to the transmitter and receiver.

4. Apparatus of the character described having, in combination, means for projecting a radio beam, means for receiving radio energy from said beam after reflection from a distant object, means for heterodyning the radio energy projected with that received to produce a beat frequency proportional to the radial velocity of the reflecting object along the line extending therefrom to the transmitter and receiver, an oscillator for modulating the radio beam projector and receiver in opposite phase to prevent interference therebetween, and means for frequency modulating said modulation oscillator for elimination of zones of zero reflection.

5. In a radio system for determining the distance to an object having motion relative to said system, the combination comprising means for generating radio frequency energy, means for alternately and periodically radiating said energy toward said object and receiving energy reflected therefrom, means for comparing the frequencies of said generated and received energies to obtain a difference frequency wave dependent upon said relative motion, and means for altering the periodicity of operation of said second means to alter a characteristic of said difference frequency wave as a function of said distance.

6. In a method of determining the distance between an object having motion relative to a viewpoint and said viewpoint, the steps comprising alternately and periodically radiating radio frequency energy toward said object and receiving reflected energy therefrom, comparing the frequencies of said transmitted and received energies to obtain a beat note due to said relative motion, and changing the periodicity with which said energies are radiated and received to cause the strength of said beat note to vary in accordance with the distance of said object from said viewpoint.

7. In a radio system for determining the distance to an object having motion relative to said system, the combination comprising transmitting means for radiating radio frequency waves toward said object, receiving means responsive at least in part to said waves after reflection from said object, detecting means for comparing frequencies related to said radiated and reflected waves to obtain a beat note occasioned by said relative motion, control means operating to increase periodically and then decrease the radiation from said transmitting means while simultaneously serving to decrease periodically and then increase the responsiveness of said receiving means, and means for altering the periodicity of operation of said control means to change the amplitude of said beat note dependent upon the distance to said object.

8. In a radio system for determining the distance of an object having motion relative to said system, the combination comprising transmitting means for radiating radio frequency waves toward said object, receiving means responsive to said waves after reflection from said object, detecting means for comparing frequencies related to said radiated and reflected waves to obtain a beat note wave occasioned by said relative motion, control means for alternately inhibiting the operation of said transmitting and receiving means periodically, and means for adjusting the periodicity of said control means to alter a characteristic of said beat note wave in accordance with said distance.

9. A method of determining the distance to an object having motion relative to the point of measurement comprising the steps of radiating a radio frequency wave in pulses, receiving said wave during intervals between pulses after said wave has been reflected from said object, detecting a beat note wave corresponding to the frequency difference between said radiated and received waves caused by said relative motion, said beat note having interruptions at the rate of said pulses of said radio frequency wave, rectifying said beat note wave, altering said pulse rate to maximize the amplitude of said rectified beat note wave, and measuring said distance in terms of said altered pulse rate.

10. In a distance determining radio system the combination of means for transmitting a radio frequency wave in pulses at a suitable repetition rate, means for receiving said wave during intervals between pulses after said wave has been reflected from an object having motion relative to said system, means for detecting a beat note corresponding to the frequency difference between said transmitted and received waves, and means for periodically varying said repetition rate to vary the strength of said beat note.

11. A system for measuring distance comprising a high frequency radio transmitter for transmitting energy toward an object whose distance is to be measured, a radio receiver adapted to receive energy from said transmitter as reflected from said object, means for amplitude modulating both said transmitted and received energies substantially in phase opposition, said modulating means being adjustably settable as to frequency for varying the strength of the received modulated energy, means for rendering said transmitter and said receiver alternately operative to avoid interference therebetween, and means for periodically varying the frequency of said alternate operation to render said receiver responsive to objects at any distance within the range of said system.

12. In distance measuring radio apparatus, means for transmitting a radio wave, means for receiving energy from said wave after reflection from a distant object, means for alternately shutting off said first and second means, frequency adjusting means for adjusting the periodicity of said shutting off means for determining the distance of said object, means for rendering said transmitting and receiving means alternately operative at a rate high in comparison to said first alternating means to avoid interference between said transmitting means and said receiving means, and means for periodically varying the frequency of said second alternation for rendering said receiving means responsive to objects at any distance within the range of said apparatus.

13. In a radio system for determining the distance to an object having motion relative to said system, the combination comprising means for generating radio frequency energy, means for alternately and periodically radiating said energy toward said object and receiving energy reflected therefrom, means for comparing the frequencies of said generated and received energies to obtain a difference frequency wave dependent upon said relative motion, means for altering the periodicity of operation of said second means to alter a characteristic of said difference frequency wave as a function of said distance, and means for indicating the frequency of said difference frequency wave.

14. In a radio system for determining the distance of an object having motion relative to said system, the combination comprising transmitting means for radiating radio frequency waves toward said object, receiving means responsive to said waves after reflection from said object, detecting means for comparing frequencies related to said radiated and reflected waves to obtain a beat note wave occasioned by said relative motion, control means for alternately inhibiting the operation of said transmitting and receiving means periodically, means for adjusting the periodicity of said control means to alter a characteristic of said beat note wave in accordance with said distance, and means for indicating the frequency of the said beat note wave.

15. A system for measuring distance comprising a high frequency directional radio beam transmitter, a radio directional beam receiver, means for alternately interrupting the operation of the transmitter and receiver at a predetermined frequency, means for directing the transmitted beam on an object whose distance is to be measured so reflection thereof will be received, means for periodically changing the frequency of interruption of the transmitter and receiver for eliminating dead spots in scanning, and modulating means for modulating the transmitter and receiver, said last named means being adjustably settable as to frequency for causing the received modulated signal to be a maximum, the setting of said modulating means providing an indication of the distance from the transmitter and receiver to the object reflecting the transmitted radiation.

16. A radio object detecting and measuring system comprising means for irradiating an object with radio energy, means for receiving reflected radio energy therefrom, means for alternately and periodically interrupting both said receiving and irradiating means, and means for amplitude modulating said irradiated and reflected energy substantially in phase opposition, said modulating means being predeterminedly frequency adjustable so as to cause maximum reception of said reflected radio energy, the adjustment of said modulating means providing an indication of distance between said irradiating means and said object.

RUSSELL H. VARIAN.
WILLIAM W. HANSEN.

REFERENCES CITED

The following references are of record in the file of this patent:

UNITED STATES PATENTS

| Number | Name | Date |
|---|---|---|
| 2,176,469 | Moueix | Oct. 17, 1939 |
| 1,585,591 | Lowy | May 18, 1926 |
| 1,945,952 | Nicolson | Feb. 6, 1934 |
| 2,189,549 | Hershberger | Feb. 6, 1940 |
| 2,055,883 | Terry | Sep. 29, 1936 |
| 2,193,361 | Rice | Mar. 12, 1940 |
| 2,247,662 | Newhouse | July 1, 1941 |

Certificate of Correction

Patent No. 2,415,095.  February 4, 1947.

RUSSELL H. VARIAN ET AL.

It is hereby certified that errors appear in the printed specification of the above numbered patent requiring correction as follows: Column 3, line 17, for "narrower" read *narrow*; line 42, for "wil lbe" read *will be*; column 14, line 52, before the syllable and hyphen "ampli-" insert *modulating means for*; and that the said Letters Patent should be read with these corrections therein that the same may conform to the record of the case in the Patent Office.

Signed and sealed this 29th day of July, A. D. 1947,

[SEAL]

LESLIE FRAZER,
*First Assistant Commissioner of Patents.*